(12) United States Patent
Diep et al.

(10) Patent No.: US 10,189,578 B2
(45) Date of Patent: Jan. 29, 2019

(54) SELF-BALANCING PRESSURE BULKHEAD

(71) Applicant: The Boeing Company, Chicago, IL (US)

(72) Inventors: Paul Diep, Bothell, WA (US);
Bernhard Dopker, Bellevue, WA (US);
Robert W. Johnson, Renton, WA (US)

(73) Assignee: The Boeing Company, Chicago, IL (US)

( * ) Notice: Subject to any disclaimer, the term of this patent is extended or adjusted under 35 U.S.C. 154(b) by 532 days.

(21) Appl. No.: 13/915,994

(22) Filed: Jun. 12, 2013

(65) Prior Publication Data

US 2014/0370227 A1    Dec. 18, 2014

(51) Int. Cl.
*B64D 45/00*    (2006.01)
*B62D 25/00*    (2006.01)
*B63B 3/60*    (2006.01)
*B64C 1/10*    (2006.01)

(52) U.S. Cl.
CPC ............ *B64D 45/00* (2013.01); *B62D 25/00* (2013.01); *B63B 3/60* (2013.01); *B64C 1/10* (2013.01); *Y10T 29/49826* (2015.01); *Y10T 428/215* (2015.01)

(58) Field of Classification Search
CPC ........ B64D 45/00; B64D 27/14; B64D 27/20; B62D 25/00; B63B 3/60; B64C 1/1492; B64C 1/1407; B64C 1/1476; B64C 1/14; B64C 1/12; B64C 2001/0072; B64C 1/068; B64C 1/061; B64C 1/10; B64C 1/066; B64C 3/26; G01S 17/936; G01S 7/497; F41G 7/2293; F41G 7/2253; Y02T 50/433; Y02T 50/46; Y02T 50/672; Y02T 30/34; Y10T 29/49826; Y10T 428/215
See application file for complete search history.

(56) References Cited

U.S. PATENT DOCUMENTS

| 4,728,059 | A | * | 3/1988 | Stephen et al. ............... 244/119 |
| 4,867,357 | A | * | 9/1989 | Inglis et al. .................. 244/121 |
| 5,024,399 | A | * | 6/1991 | Barquet et al. ............... 244/119 |
| 5,062,589 | A | * | 11/1991 | Roth et al. .................. 244/117 R |
| 5,125,600 | A | * | 6/1992 | Brumbaugh .................. 244/121 |

(Continued)

FOREIGN PATENT DOCUMENTS

| EP | 0387400 A2 | 9/1990 |
| EP | 2098448 | 9/2009 |

(Continued)

OTHER PUBLICATIONS

Extended European Search Report, European Application No. 14169530.4, dated Nov. 5, 2014.

(Continued)

*Primary Examiner* — Medhat Badawi
(74) *Attorney, Agent, or Firm* — Vivacqua Law (57) ABSTRACT

A pressure bulkhead may include a bulkhead wall having a radially inner disk and a radially outer compression ring, the outer compression ring being reinforced to balance meridional and hoop stresses sustained by the bulkhead wall in response to a pressure differential across the pressure bulkhead; and the radially inner disk being unitary with the outer compression ring and being made of the same material as the outer compression ring.

16 Claims, 10 Drawing Sheets

(56) References Cited

U.S. PATENT DOCUMENTS

| | | | |
|---|---|---|---|
| 5,143,276 A * | 9/1992 | Mansbridge et al. | 228/157 |
| 5,167,386 A * | 12/1992 | Laquer et al. | 244/121 |
| 5,171,510 A * | 12/1992 | Barquet et al. | 264/258 |
| 5,743,492 A * | 4/1998 | Chan et al. | 244/118.2 |
| 6,378,805 B1 * | 4/2002 | Stephan et al. | 244/119 |
| 6,443,392 B2 * | 9/2002 | Weber et al. | 244/117 R |
| 7,082,878 B2 * | 8/2006 | Facciano et al. | 102/377 |
| 7,909,289 B2 * | 3/2011 | Perez-Sanchez | 244/129.4 |
| 8,061,656 B1 * | 11/2011 | Renn et al. | 244/122 AF |
| 8,226,870 B2 * | 7/2012 | Garcia Laja et al. | 264/241 |
| 8,333,151 B2 * | 12/2012 | Krisher | 102/378 |
| 2001/0025903 A1 * | 10/2001 | Weber et al. | 244/129.5 |
| 2001/0035118 A1 * | 11/2001 | Matsui et al. | 114/78 |
| 2002/0146278 A1 * | 10/2002 | Wolfgang | 403/188 |
| 2006/0266886 A1 * | 11/2006 | Nachbar | 244/125 |
| 2007/0164159 A1 * | 7/2007 | Koch et al. | 244/121 |
| 2009/0173824 A1 * | 7/2009 | Perez-Sanchez | 244/129.4 |
| 2010/0065685 A1 * | 3/2010 | Basso | 244/119 |
| 2010/0176241 A1 * | 7/2010 | Meyer et al. | 244/119 |
| 2010/0243806 A1 * | 9/2010 | Vera Villares et al. | 244/119 |
| 2010/0310242 A1 * | 12/2010 | Zubalsky et al. | 396/12 |
| 2011/0101164 A1 * | 5/2011 | Koch et al. | 244/121 |
| 2013/0087657 A9 * | 4/2013 | Koch et al. | 244/121 |
| 2014/0322484 A1 | 10/2014 | Teshima et al. | |

FOREIGN PATENT DOCUMENTS

| | | |
|---|---|---|
| EP | 2415661 | 2/2012 |
| EP | 2428444 | 3/2012 |
| FR | 2940959 A1 | 7/2010 |
| JP | 10325415 A | 12/1993 |
| JP | 06210748 A | 8/1994 |
| JP | 2009523655 A | 6/2009 |
| JP | 2009541118 A | 11/2009 |
| JP | 2011500452 A | 1/2011 |
| WO | 99/24316 A1 | 5/1999 |
| WO | 2007084227 A2 | 7/2007 |
| WO | 2009056643 A2 | 5/2009 |
| WO | 2013080975 A1 | 6/2013 |

OTHER PUBLICATIONS

JPO, Notice of Reasons for Rejection, dated Jun. 5, 2018.
JPO, Notice of Reasons for Rejection, dated Oct. 23, 2018.

* cited by examiner

SELF-BALANCING PRESSURE BULKHEAD

FIELD

The present disclosure relates to pressure bulkheads, and more particularly, pressure bulkheads for use in vehicles.

BACKGROUND

Pressure bulkheads are used in vehicles, such as aircraft, to separate a pressurized compartment from an unpressurized compartment. In one typical application, a pressure bulkhead may be mounted within an aircraft fuselage and attached to the outer skin of the aircraft. Such pressure bulkhead mountings typically are complicated and heavily reinforced.

In one example, a pressure bulkhead may include an outer chord assembly composed of a machined Y-chord, failsafe angle, inner chord, and outer break rings. The bulkhead may be backed up with machined stringer end fittings at every stringer location. The stringer end fittings may have to align across a pressure bulkhead and the bulkhead is installed with heavy and complicated machined titanium Y-chord segments, an aluminum inner chord, web, and a separate bolted aluminum failsafe chord. The bulkhead may also contain a ½-inch thick CFRP (carbon fiber reinforced plastic) splice strap sandwiched between the titanium Y-chord and the fuselage skin, and the titanium stringer end fittings. The manufacturing process may involve many processes such as drilling, deburring, fay surface sealing, and considerable labor hours to meet all structural requirements due to multiple different materials present in stackup (e.g., CFRP, titanium, aluminum).

Such pressure bulkheads are heavy and costly to produce in order to meet corrosion and fatigue requirements due to differences in material galvanic properties and differing coefficients of thermal expansion. Pressure bulkheads may be heavy due to inefficient loading which require more material to resist deformation or crack initiation.

Accordingly, there remains a need for a compact, lightweight and low-cost pressure bulkhead having relatively simple construction.

SUMMARY

In one embodiment, a pressure bulkhead may include a dome-shaped bulkhead wall having a radially inner disk and a radially outer compression ring, the outer compression ring being reinforced to balance meridional and hoop stresses sustained by the bulkhead wall in response to a pressure differential across the pressure bulkhead; and the radially inner disk being unitary with the outer compression ring.

In another embodiment, pressure bulkhead may include a dome-shaped bulkhead wall having a radially inner disk made of an isotropic carbon fiber reinforced plastic laminate, and an outer compression ring made of an orthotropic carbon fiber reinforced plastic laminate attached to and extending about a periphery of the radially inner disk, the outer compression ring balancing meridional and hoop stresses sustained by the bulkhead wall in response to a pressure load applied to the bulkhead wall.

In yet another embodiment, a pressure bulkhead may include a dome-shaped bulkhead wall having a radially inner disk made of metal and having a first thickness, and a compression ring made of metal attached to and extending about a periphery of the inner disk, the compression ring having a second thickness greater than the first thickness and sufficient to balance meridional and hoop stresses sustained by the bulkhead wall in response to a pressure load applied to the bulkhead wall.

In yet another embodiment, a pressure bulkhead may include a dome-shaped bulkhead wall having a substantially uniform thickness attached to one or more doubler rings at a periphery of the bulkhead wall that is sufficient to balance meridional and hoop stresses sustained by the bulkhead wall in response to a pressure load applied to the bulkhead wall.

In still another embodiment, a method of mounting a pressure bulkhead in an aircraft may include affixing to a fuselage skin of the aircraft an attachment ring having an inner band and an outer band defining a concave surface such that the concave surface is directed toward a non-pressurized section of the aircraft when the aircraft fuselage is under a pressure load; and attaching an outer periphery of a bulkhead wall to the attachment ring, the bulkhead wall having a radially inner disk and a radially outer compression ring, the outer compression ring being of sufficient strength to balance meridional and hoop stresses sustained by the bulkhead wall in response to a pressure load applied to the bulkhead wall.

In an alternative embodiment, a pressure bulkhead may include a bulkhead wall having a substantially uniform thickness attached to one or more doubler rings at a periphery of the bulkhead wall that is sufficient to balance meridional and hoop stresses sustained by the bulkhead wall in response to a pressure load applied to the bulkhead wall.

Other objects and advantages of the disclosed pressure bulkhead will be apparent from the following description, the accompanying drawings and the appended claims.

DETAILED DESCRIPTION

Figure 1:
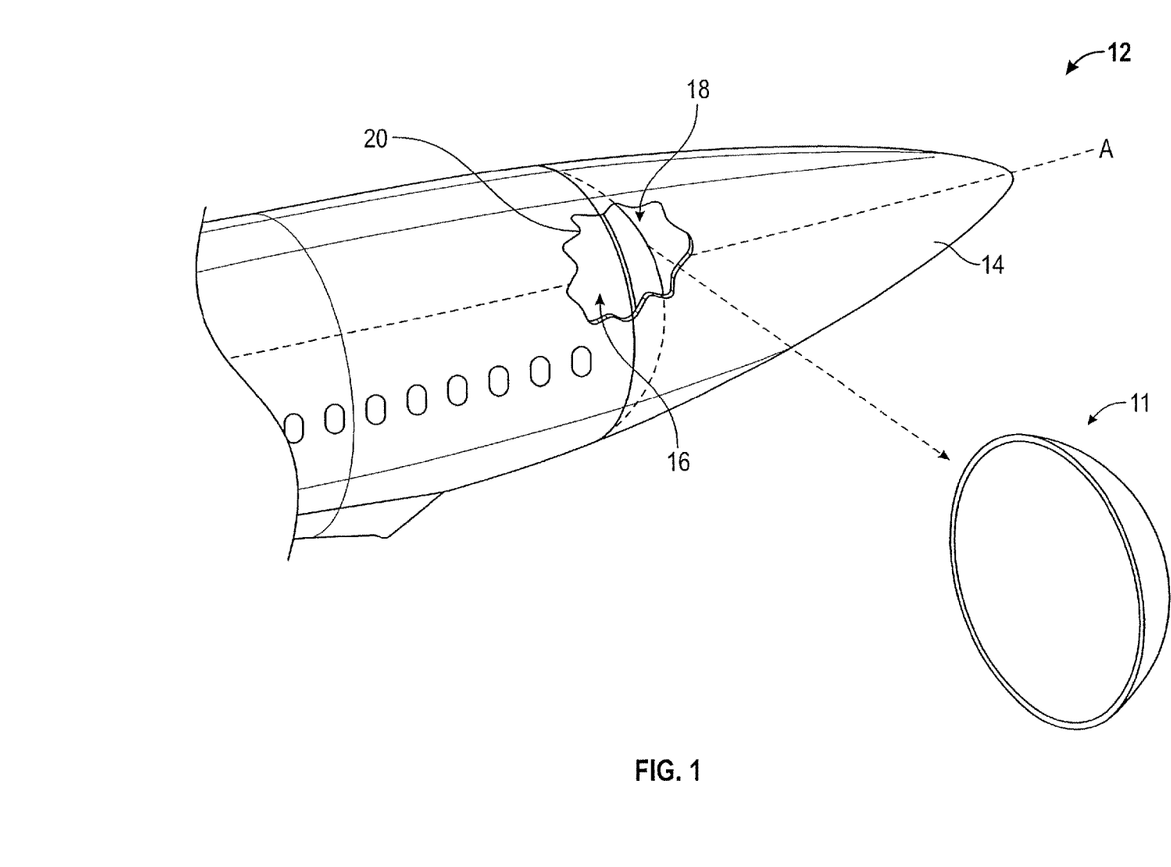
FIG. 1 is a schematic, perspective view of the disclosed self-balancing pressure bulkhead, shown mounted in an aircraft.
Figure 2:
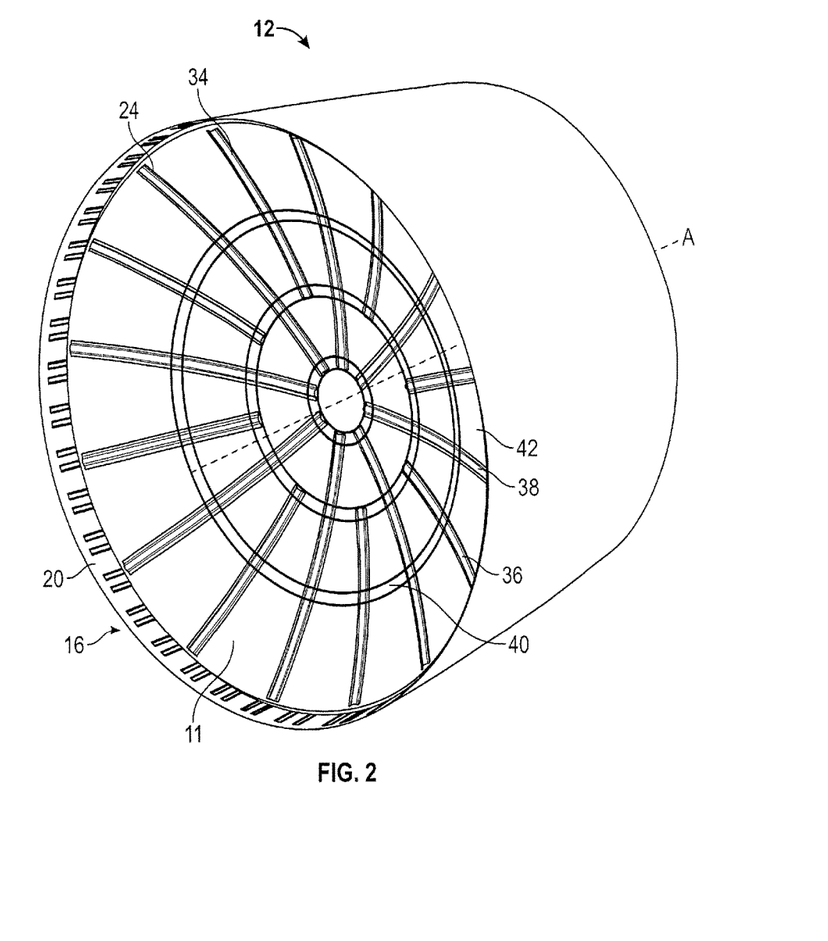
FIG. 2 is a perspective view of the self-balancing pressure bulkhead of FIG. 1, taken from the pressurized side, shown mounted in a section of aircraft fuselage.

As shown in FIGS. 1 and 2, the disclosed self-balancing pressure bulkhead, generally designated 11, may be in the form of a disk or a dome, or be dome-shaped, and shaped for placement inside a vehicle, which in an embodiment may be aircraft 12, for example in the fuselage 14 of the aircraft, to separate a pressurized fuselage interior 16 (e.g., a pressurized cabin) from an unpressurized fuselage interior 18. Other types of vehicles may employ the bulkhead 11, such as spacecraft, reentry vehicles, orbiting space stations, land vehicles, and marine vehicles such as submarines. Pressure bulkhead 11 may be attached to fuselage skin 20 such that the pressure bulkhead does not shift along fuselage longitudinal axis A of the aircraft 12.

Figure 8:
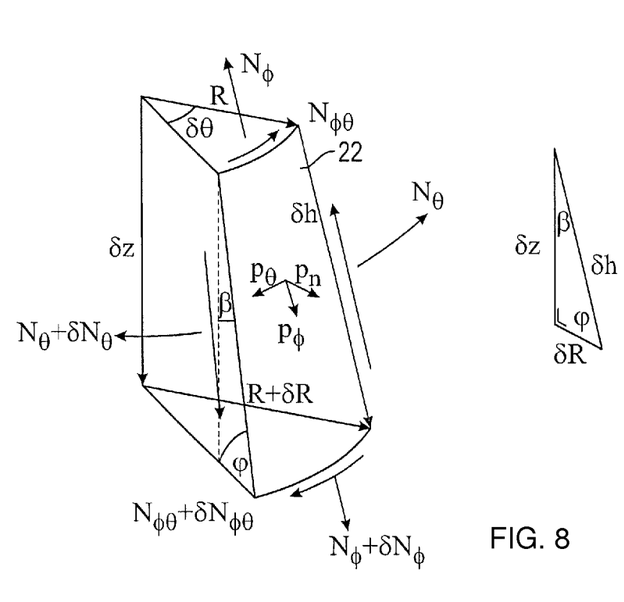
FIG. 8 is a diagram of the forces on the self-balancing pressure bulkhead of FIG. 1 in meridional, hoop and normal directions.

The terms "meridional" and "hoop stresses" with respect to a bulkhead wall may be known to a person of ordinary skill in the art. For example, without being limited to a particular theory, in an infinitesimally small truncated conical bulkhead wall section 22, equilibrium equations for normal, meridional and hoop stresses may also be derived for an infinitesimally small conical shell element as shown in the progression of equations below with reference to FIG. 8. In FIG. 8, $N_\varphi$ and $N_\theta$ are membrane stress resultants in the meridional and circumferential (hoop) directions (N/m), respectively, in the bulkhead 11 of FIGS. 1 and 2; $N_{\varphi\theta}$ is a shear stress resultant (N/m); $p_n$, $p_\theta$, $p_\varphi$ are distributed surface loadings in the normal, circumferential and meridional directions (N/m²) respectively; R is radius of a theoretical barrel/cylinder (m); and θ is the angle of spread. (For a detailed explanation, wee http://www.kpq.ie/research/shelltheory.html).

From a triangle: $\cos \varphi = \sin \beta$ and $\sin \varphi = \cos \beta$ $$\therefore \partial h = \frac{\partial z}{\sin\varphi} = \frac{\partial z}{\cos\beta} \text{ and } \partial R = \frac{\cos\varphi}{\sin\varphi}\partial z = \frac{\sin\beta}{\cos\beta}\partial z,$$

$$\text{hence } R = \frac{\sin\beta}{\cos\beta}z \text{ and } R\partial h = z\partial z\frac{\sin\beta}{\cos\beta}.$$

Use small angle approximation: As $\partial\theta \to 0$, $\cos \partial\theta \to 1$ and $\sin \partial\theta \to \partial\theta$, and also $\partial\theta^2 \approx 0$, $\partial N_\theta \approx 0$, $\partial N_\varphi \approx 0$, $\partial_{\varphi\theta} = 0$, $\partial R \partial h \approx 0$.

Normal Equilibrium:

$$p_n(R+\partial R)\partial\theta\partial h = N_\theta \partial\theta\partial h \cos\beta$$

$$p_n R\partial\theta\partial h + p_n \partial R\partial\theta\partial h = N_\theta \partial\theta\partial h \cos\beta$$

$$p_n \partial z \frac{\sin\beta}{\cos\beta}\partial\theta\frac{1}{\cos\beta} = N_\theta \partial\theta\partial z \frac{\cos\beta}{\cos\beta}$$

$$N_\theta = p_n z \frac{\sin\beta}{\cos^2\beta}$$

$$\therefore N_\theta = p_n z \sec\beta \tan\beta \quad (1)$$

Circumferential Equilibrium:

$$N_{\varphi\theta}R\partial\theta + N_\theta\partial h = (N_{\varphi\theta}+\partial N_{\varphi\theta})(R+\partial R)\partial\theta + (N_\theta \partial N_\theta)\partial h + p_\theta(R+\theta R)\partial\theta\partial h + N_{\varphi\theta}\partial h\partial\theta \sin\beta$$

$$\partial N_\theta\partial h + N_{\varphi\theta}\partial R\partial\theta + \partial N_{\varphi\theta}R\partial\theta + \partial N_{\varphi\theta}\partial R\partial\theta + p_\theta R\partial\theta\partial h + N_{\varphi\theta}\partial h\partial\theta \sin\beta = 0$$

$$\frac{\partial N_\theta \partial z}{\cos\beta} + \frac{N_{\varphi\theta}\partial z\partial\theta\sin\beta}{\cos\beta} + \frac{\partial N_{\varphi\theta}z\partial\theta\sin\beta}{\cos\beta} +$$

-continued $$\frac{\partial N_{\varphi\theta}z\partial z\partial\theta\sin\beta}{\cos\beta} + \frac{p_\theta z\partial\theta\partial z}{\cos\beta} + \frac{N_{\varphi\theta}\partial z\partial\theta\sin\beta}{\cos\beta} = 0$$

$$\frac{\partial N_\theta}{\partial\theta}\cdot\frac{1}{\sin\beta} + N_{\varphi\theta} + \frac{z\partial N_{\varphi\theta}}{\partial z} + p_\theta z \frac{1}{\cos\beta} + N_{\varphi\theta} = 0$$

But from equation 1, $$N_\theta = p_n z \frac{\sin\beta}{\cos^2\beta} \text{ hence } \frac{\partial N_\theta}{\partial\theta} = \frac{z\partial p_n}{\partial\theta}\frac{\sin\beta}{\cos^2\beta}.$$

$$2N_{\varphi\theta} + \frac{z\partial N_{\varphi\theta}}{\partial z} = -z\frac{1}{\cos\beta}\left(p_\theta + \frac{1}{\cos\beta}z\frac{\partial p_n}{\partial\theta}\right)$$

$$\therefore 2N_{\varphi\theta} + \frac{z\partial N_{\varphi\theta}}{\partial z} = -z\sec\beta\left(p_\theta + \sec\beta z\frac{\partial p_n}{\partial\theta}\right) \quad (2)$$

Meridional Equilibrium:

$$N_\varphi R\partial\theta + N_{\varphi\theta}\partial h + N_\theta\partial h\partial\theta \sin\beta = p_\varphi(R+\partial R)\partial\theta\partial h + (N_\varphi + \partial N_\varphi)(R+\partial R)\partial\theta + (N_{\varphi\theta}+\partial N_{\varphi\theta})\partial h$$

$$N_\theta\partial h\partial\theta \sin\beta = p_\varphi R\partial\theta\partial h + N_\varphi\partial R\partial\theta + \partial N_\varphi R\partial\theta + \partial N_\varphi\partial R\partial\theta + \partial N_{\varphi\theta}\partial h$$

$$\frac{N_\theta\partial h\partial\theta\sin\beta}{\cos\beta} =$$

$$\frac{p_\varphi z\partial\theta z\sin\beta}{\cos^2\beta} + \frac{N_\varphi\partial z\partial\theta\sin\beta}{\cos\beta} + \frac{\partial N_\varphi z\partial\theta\sin\beta}{\cos\beta} + \frac{\partial N_\varphi\partial z\partial\theta\sin\beta}{\cos\beta} + \frac{\partial N_{\varphi\theta}\partial z}{\cos\beta}$$

$$N_\theta = p_\varphi z\frac{1}{\cos\beta} + N_\varphi + \frac{z\partial N_\varphi}{\partial z} + \partial N_\varphi + \frac{\partial N_{\varphi\theta}}{\partial\theta}\frac{1}{\sin\beta}$$

$$N_\varphi + \frac{z\partial N_\varphi}{\partial z} = -\frac{\partial N_{\varphi\theta}}{\partial\theta}\frac{1}{\sin\beta} + N_\theta - p_\varphi z\frac{1}{\cos\beta} - \partial N_\varphi$$

But from Equation 1, $$N_\theta = p_n z\frac{\sin\beta}{\cos^2\beta}$$

$$N_\varphi + \frac{z\partial N_\varphi}{\partial z} = -\frac{1}{\sin\beta}\frac{\partial N_{\varphi\theta}}{\partial\theta} + z\frac{1}{\cos\beta}\left(p_n\frac{\sin\beta}{\cos\beta} - p_\varphi\right)$$

$$\therefore N_\phi + \frac{z\partial N_\phi}{\partial z} = -\text{cosec}\beta \frac{\partial N_{\phi\theta}}{\partial \theta} + z\sec\beta(p_n\tan\beta - p_\phi) \quad (3)$$

Figure 3:
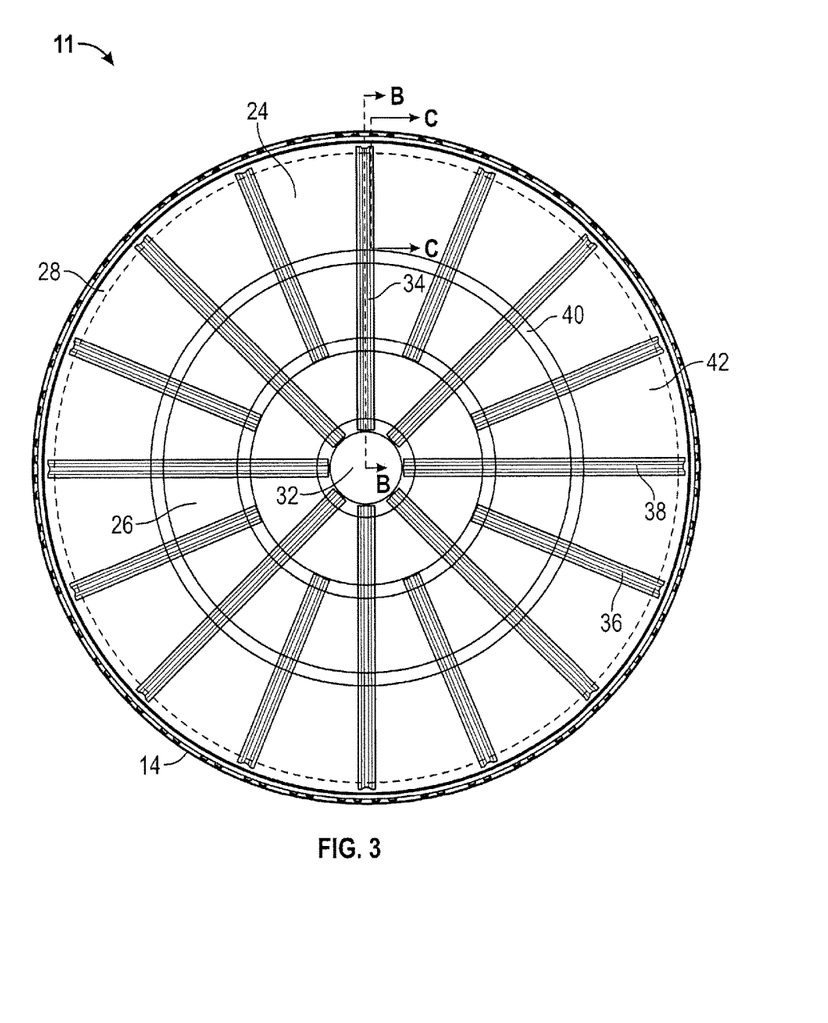
FIG. 3 is a front elevational view of the self-balancing pressure bulkhead of FIG. 1, taken from the pressurized side, shown mounted in the section of aircraft fuselage.

In an embodiment, as shown in FIG. 3, the pressure bulkhead 11 may include a bulkhead wall 24 having a radially inner disk 26 and a radially outer compression ring 28, the outer compression ring being reinforced to balance meridional and hoop stresses sustained by the bulkhead wall in response to a pressure differential across the pressure bulkhead. The radially inner disk 26 may be unitary with the outer compression ring 28 and/or made of the same material as the outer compression ring.

Figure 4:
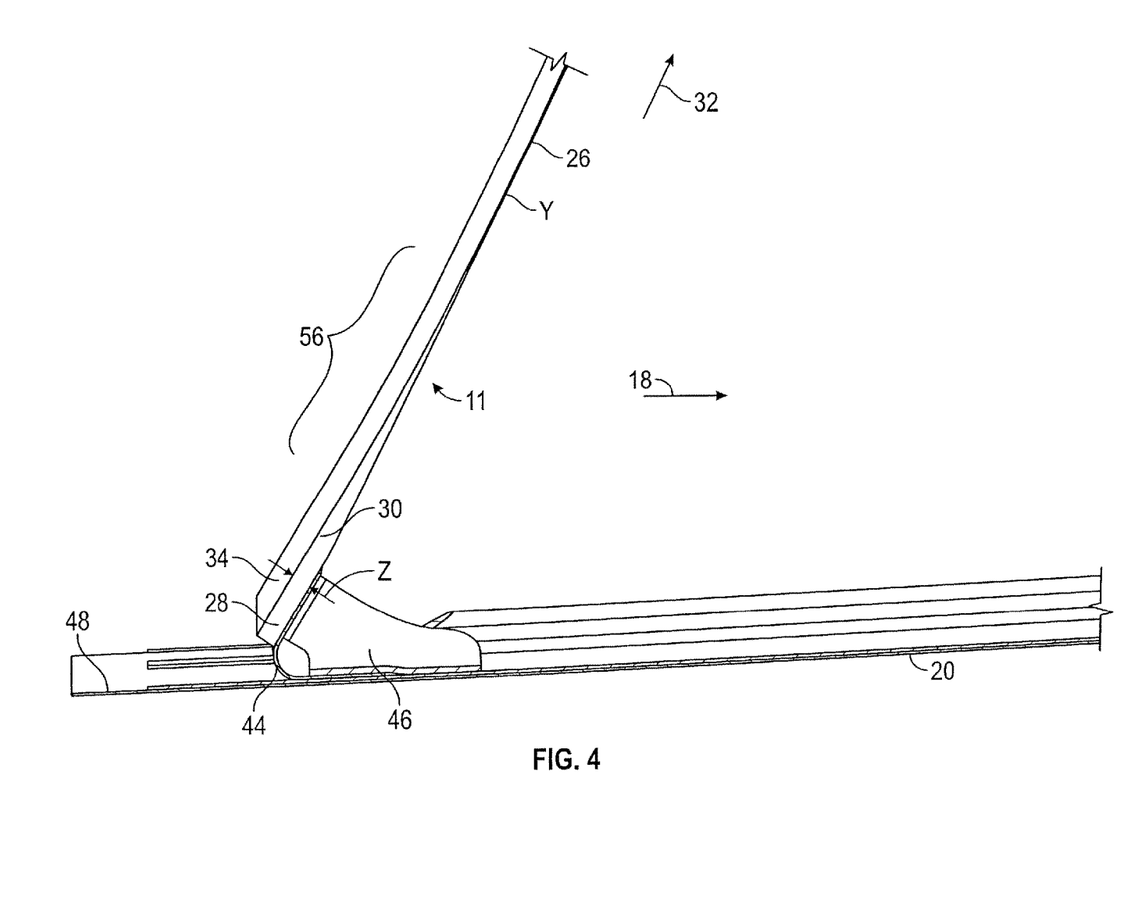
FIG. 4 is a detail taken at line C-C of FIG. 3.
Figure 5:
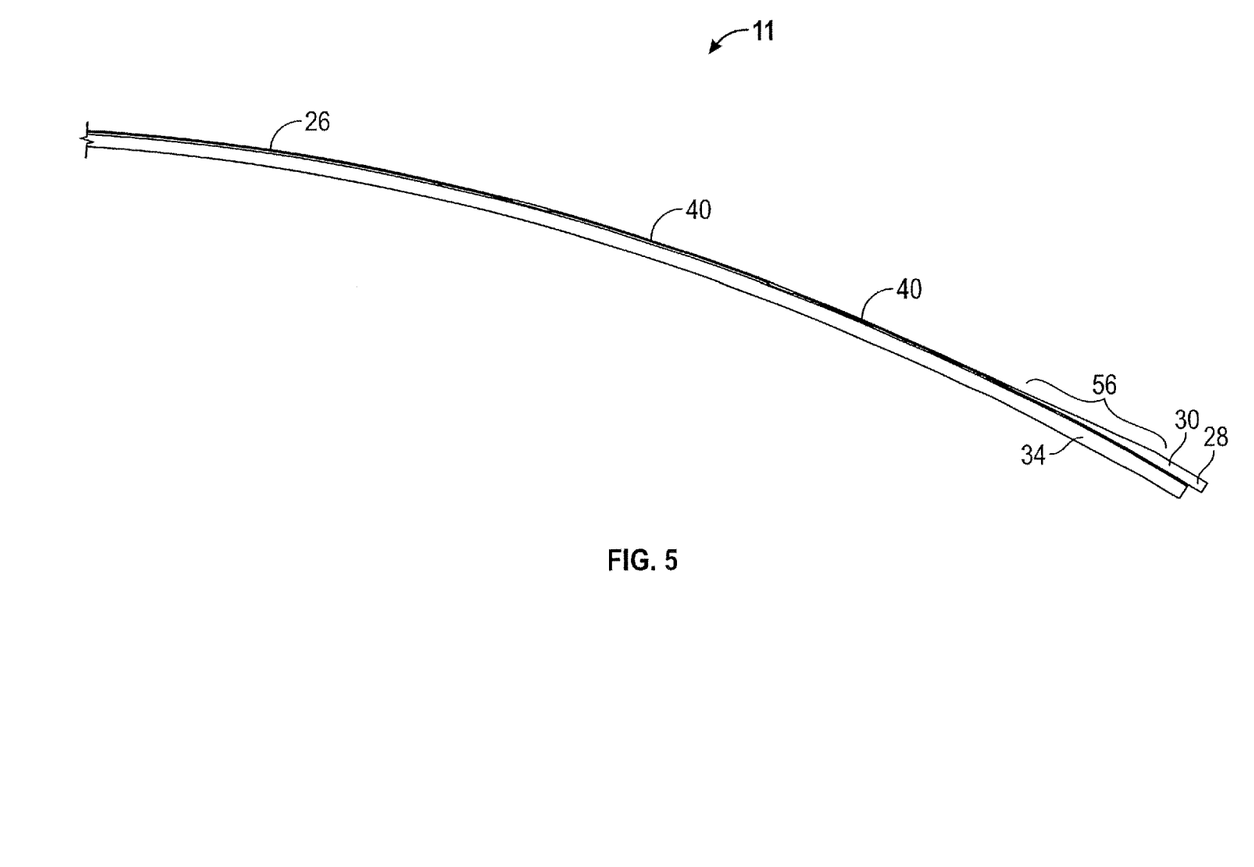
FIG. 5 is a detail taken at line B-B of FIG. 3.

In an embodiment, as shown in FIGS. 3, 4, and 5, the radially inner disk 26 may have a first thickness y, and the outer compression ring 28 may have a second thickness z greater than the first thickness y. In an embodiment, the thickness of the radially inner disk 26 tapers from an outer periphery 30 adjacent the outer compression ring 28 to a center 32 of the pressure bulkhead 11.

In an embodiment, the taper:distance ramp may be from about 1:5 to about 1:100. In an embodiment, the bulkhead wall 24, that is, the radially inner disk 26 and the outer compression ring 28, may be made of carbon fiber reinforced plastic (CFRP). In an embodiment, the taper:distance ramp for a CFRP bulkhead wall may be from about 1:10 to about 1:100.

In an embodiment, the bulkhead wall 24, that is, the radially inner disk 26 and the outer compression ring 28, may be made of a metal, for example, aluminum, titanium, or an aluminum alloy. In an embodiment, the taper:distance ramp for a metal bulkhead wall may be from about 1:5 to about 1:10. In an embodiment, the ramp may be from a step function to a ramp from 1:1 to 1:100.

In an embodiment, the pressure bulkhead 11 further may include a plurality of stiffeners 34 attached to the bulkhead wall 26 and extending in a radial direction, for example, a meridional direction, from center 32 toward the outer compression ring 28, The stiffeners 34 may be evenly spaced about the bulkhead wall 26 in a spoke-like fashion as shown in FIG. 3, or in embodiments may be unevenly spaced. The plurality of stiffeners 34 may include a shorter stiffener 36 and/or a longer stiffener 38.

In an embodiment, the bulkhead 11 may include one or more tear straps and/or reinforcement regions, for example, annular tear straps 40 attached to the bulkhead wall 24 (see FIG. 2). Stiffeners 34 and annular tear strips 40 may form a plurality of tear regions 42. In an embodiment, the reinforcement regions may be of any configuration, dimension and/or orientation along the bulkhead wall, for example, those known to one of skill in the art as polar or Cartesian regions, With reference to FIGS. 4, 6, and 7, in an embodiment, the pressure bulkhead 11 may include an attachment mechanism in the form of an attachment ring 44 attached to the outer compression ring 28. In another embodiment, the attachment of the bulkhead wall 24 to the attachment ring 44 may be by means such as by an adhesive, by a plurality of screws (not shown) spaced about the periphery of the bulkhead wall 24, or by rivets (not shown) spaced about the periphery of the bulkhead wall, and the like.

Figure 6:
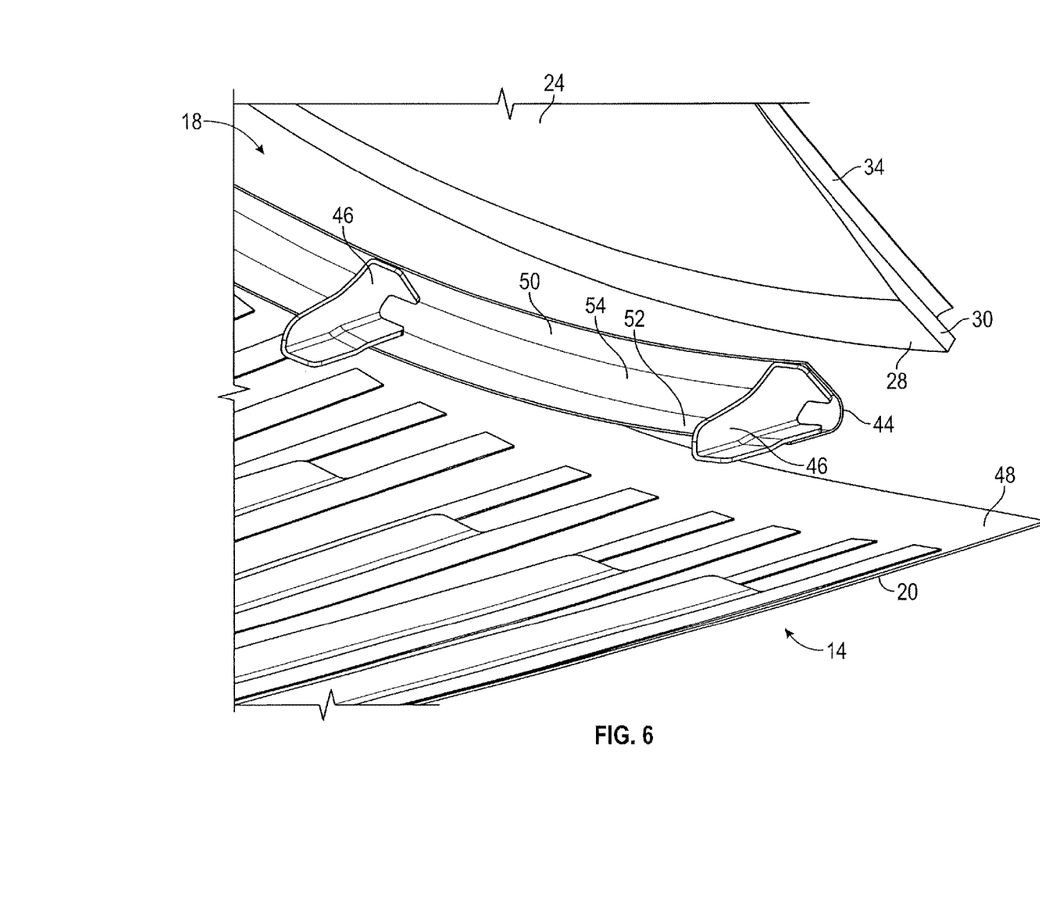
FIG. 6 is a detail showing an exploded view in perspective of the self-balancing pressure bulkhead of FIG. 1 and an associated vehicle fuselage.
Figure 7:
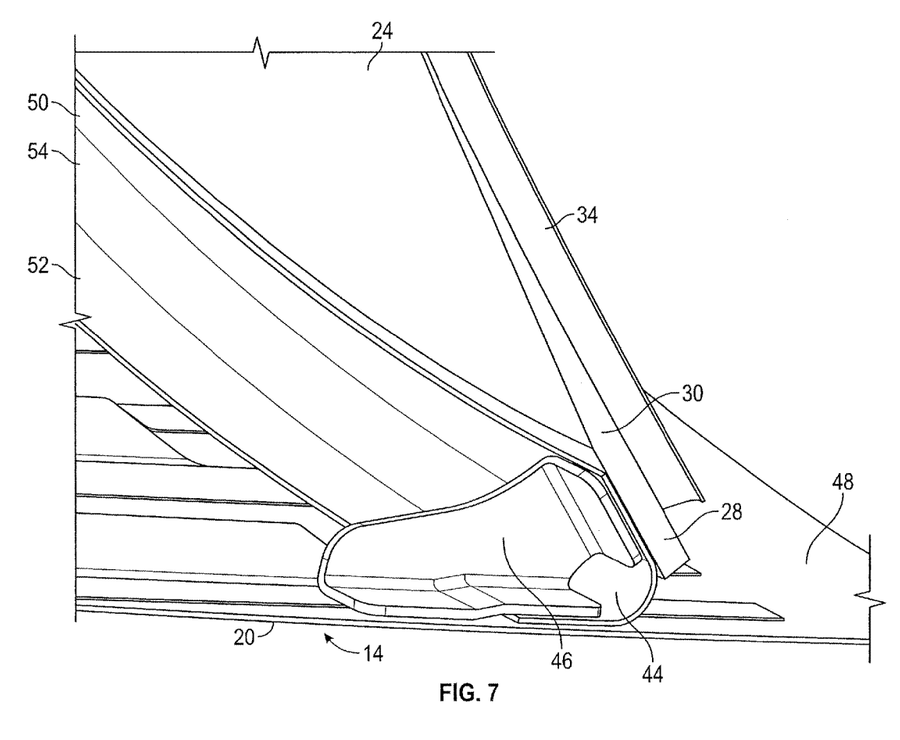
FIG. 7 is a detail showing a perspective view of the self-balancing pressure bulkhead of FIG. 1, annular bracket, and clip for mounting the pressure bulkhead to the aircraft fuselage.

With reference to FIGS. 1, 6, and 7, in an embodiment, the bulkhead 11 may further comprise a plurality of clips 46 configured to attach the attachment ring 44 to a wall 48 of, for example, an aircraft fuselage 14. In an embodiment, the wall 48 may be the skin 20 of an aircraft. The clips 46 may be attached to the skin 20 of the aircraft by, for example, bolting the clips to the skin.

With reference to FIGS. 1, 4, 5, 6, and 7, in an embodiment, the pressure bulkhead 11 may include a bulkhead wall 24 having a radially inner disk 26 made of an isotropic carbon fiber reinforced plastic laminate, and an outer compression ring 28 made of an orthotropic carbon fiber reinforced plastic laminate attached to and extending about a periphery 30 of the radially inner disk 26. In an embodiment, the outer compression ring 28 may be selected to be of sufficient strength to balance meridional and hoop stresses sustained by the dome-shaped bulkhead wall 24 in response to a pressure load applied to the bulkhead wall, such as a pressure differential across the bulkhead wall. In an embodiment, a taper region 56 of radially inner disk 26 extending from periphery 30 toward center 32 may include isotropic carbon fiber reinforced plastic laminate and/or orthotropic carbon fiber reinforced plastic laminate.

With reference to FIGS. 1, 4, 5, 6, and 7, in an embodiment, the radially inner disk 26 and/or compression ring may be made of an isotropic carbon fiber reinforced plastic laminate and/or an orthotropic carbon fiber reinforced plastic laminate and/or a similar and CFRP-compatible material. The term "similar" may mean, material sufficient to provide performance at least substantially equivalent to an isotropic carbon fiber reinforced plastic laminate as measured by stressing the material in normal, circumferential and meridional directions along the bulkhead wall. The term "compatible" may mean one or more materials that may be laminated with CFRP without disintegration. For example, a poly-paraphenylene terephthalamide-based material may be used. Such materials are sold under the trademark Kevlar® and are available from the DuPont Company, Wilmington, Del. Suitable Kevlar® poly-paraphenylene terephthalamides include Kevlar® K-29, Kevlar® K49, Kevlar® K100, Kevlar® K119, Kevlar® K129, Kevlar® AP, Kevlar® XP and/or Kevlar® KM2, In an embodiment, the inner disk and compression ring may be unitary. By the term unitary is meant that the disk and compression ring are not seamed, joined, or welded together thus forming a joint between the disk and the compression ring. In another embodiment, the disk and ring may be made of different laminate types or materials, but in the method of production, both are formed together in the same laminating process. The terms "isotropic carbon reinforced plastic laminate" and "orthotropic carbon reinforced plastic laminate" may be known to a person of ordinary skill in the art and such laminates may be constructed according to known methods. In an embodiment, an orthotropic carbon reinforced plastic laminate may include laminates preferentially oriented along a circumferential, or hoop, stress resultant to balance such pressure-load stresses. With reference to FIG. 8, normal, circumferential (hoop), and meridional resultants calculated from $p_n$, $p_\theta$, $p_\sigma$ are used to determine sufficient laminate strengths to react or oppose such resultants across the entire bulkhead 11. Such calculations may be known to a person of skill in the art of mechanical stress modeling.

With reference to FIGS. 1, 4, 6, and 7, in an embodiment, a pressure bulkhead 11 may include a bulkhead wall 24 having a radially inner disk 26 made of metal and having a first thickness y, and a compression ring 28 made of metal attached to and extending about a periphery 30 of the inner disk. The compression ring may have a second thickness z greater than the first thickness y and sufficient to balance meridional and hoop stresses sustained by the bulkhead wall 24 in response to a pressure load applied to the bulkhead wall. In an embodiment, the metal may be aluminum, titanium, a mixture thereof, or an alloy of either or both aluminum and titanium.

With reference to FIGS. 1-7, in an embodiment, there may be provided a vehicle 12 having a fuselage 14 enclosed by a skin 20; and a pressure bulkhead 11 attached to the skin, about a periphery 30 of the outer compression ring 28. In embodiments, the vehicle 12 may be one of an aircraft, a spacecraft, a marine vessel, and a land vehicle.

With reference to FIGS. 1-7, in an embodiment, the periphery 30 of the bulkhead wall 24 may comprise an attachment ring 44 having a radially inner band 50 and a radially outer band 52. The attachment ring 44 may be shaped to form a concave surface 54 oriented toward a non-pressurized section 18 of the vehicle fuselage 14. The radially outer band 52 may be attached to the skin 20 of the vehicle fuselage 14. The radially inner band 50 may be attached to the compression ring 28.

With reference to FIGS. 1-7, in an embodiment, a method of mounting a pressure bulkhead 11 in a vehicle, for example, an aircraft, includes affixing to a fuselage skin 20 of the aircraft an attachment ring 44 having an inner band 50 and an outer band 52 defining a concave surface 54 such that the concave surface 54 is directed toward a non-pressurized section 18 of the aircraft when the aircraft fuselage is under a pressure load; and attaching a periphery 30 of a bulkhead wall 24 to the attachment ring 44, the bulkhead wall 24 having a radially inner disk 26 and a radially outer compression ring 28, the inner disk 26 and outer compression ring 28 being made of the same material, the material being one of carbon fiber reinforced plastic and/or metal, the outer compression ring 28 being of sufficient strength to balance meridional and hoop stresses sustained by the bulkhead wall 24 in response to a pressure load applied to the bulkhead wall 24.

In an embodiment, the attachment ring 44 and/or the clip 46 is made of one of carbon fiber reinforced plastic and/or metal. In another embodiment the installing may further comprise a plurality of clips 46 on the concave surface 54 which clips 46 are configured to fix the attachment ring 44 to the skin 48.

In an alternative embodiment the bulkhead wall 24 may be attached to the attachment ring 44 by mounting the periphery 30 and/or the compression ring 28 on the concave surface 54, that is, between the attachment ring 44 and the clip 46.

The bulkhead 11 described herein provides a lightweight alternative to conventional pressure bulkheads. By providing a relatively strong compression ring 28 that is connected to a relatively weaker, and in some embodiments thinner, radially inner disk 26, the compression ring provides resistance to the hoop stress imposed by pressure differential across the surface of the radially inner disk. In some embodiments, the outer compression ring 28 may be made of the same material as the radially inner disk 26, such as CFRP, in which case the outer compression ring may be relatively thick and the radially inner disk may taper in thickness radially inward to the center of the radially inner disk.

Figure 9:
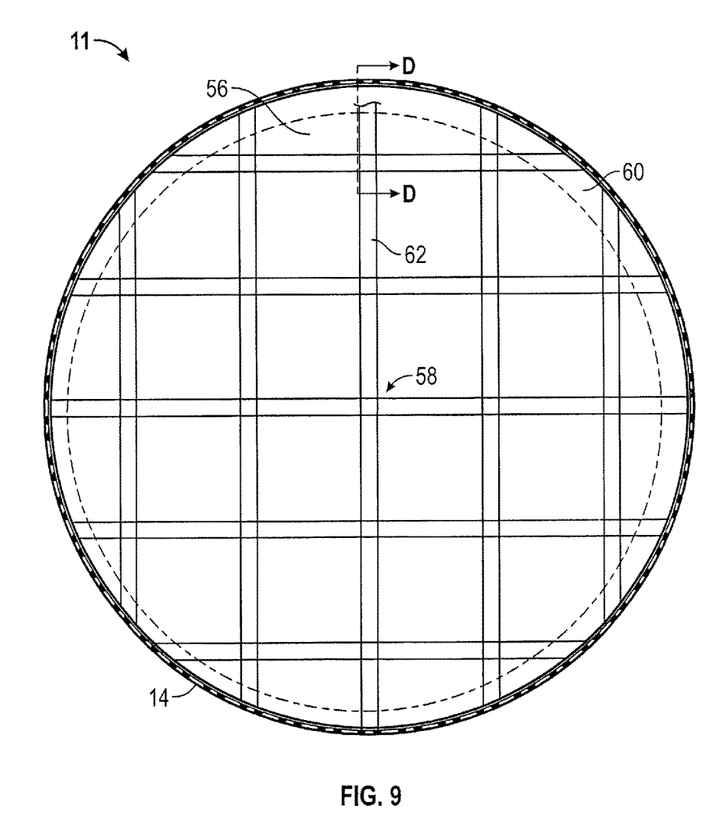
FIG. 9 is a front elevational view of an alternative embodiment of the disclosed self-balancing pressure bulkhead, taken from the pressurized side.
Figure 10:
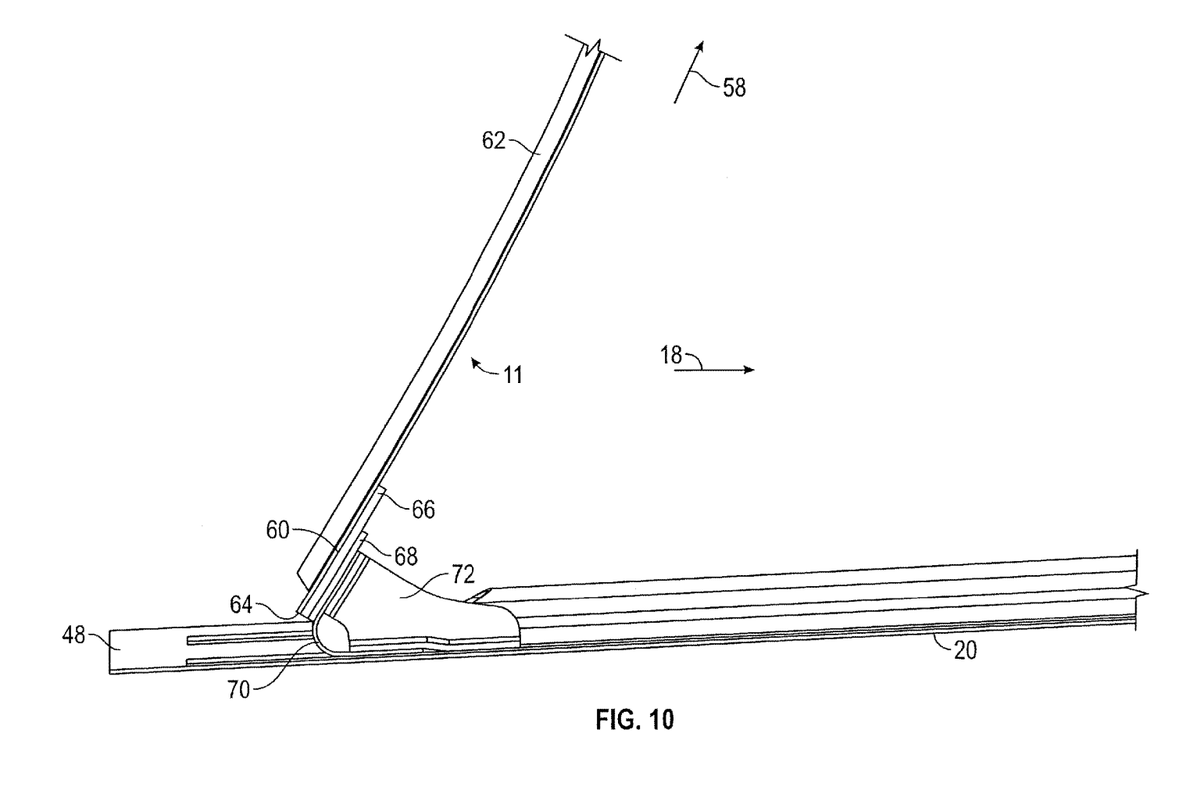
FIG. 10 is a detail taken at line D-D of FIG. 9.

With reference to FIG. 9 and FIG. 10, in an alternative embodiment, the pressure bulkhead 11 may include bulkhead wall 56 of substantially uniform thickness from center 58 to periphery 60. The pressure bulkhead 11 further may include a plurality of stiffeners 62 attached to the bulkhead wall 56 in a Cartesian configuration. From periphery 60 to the edge 64, an attachment mechanism in the form of one or more doubler rings 66, 68 may be in contact with bulkhead wall 56 and a structure to join the bulkhead wall 56 to the skin 48. In an embodiment, the one or more doubler rings 66, 68 may contact the bulkhead wall on either side of bulkhead wall 56 or on one side of the bulkhead wall 56. In an embodiment, the one or more doubler rings 66, 68 may be of the same or of different size. In an embodiment, two or more doubler rings may be placed on both sides of the bulkhead wall 56. The bulkhead wall may be made of any suitable material, for example, CFRP and/or metal. The doubler ring may be made of any suitable material, for example CFRP and/or metal.

In another alternative embodiment, the one or more doubler rings 66, 68 may be attached to attachment ring 70. Attachment ring 70 may be shaped to form a concave surface oriented toward a non-pressurized section 18 of the vehicle fuselage 14 and the attachment ring 70 may be attached to the wall 48.

The bulkhead 11 may further comprise a plurality of clips 72 configured to attach the attachment ring 70 to wall 48 of, for example, an aircraft fuselage 14. In an embodiment, the wall 48 may be the skin 20 of an aircraft. The clips 72 may be attached to the skin 20 of the aircraft by, for example, bolting the clips to the skin.

While the forms of apparatus and methods disclosed herein constitute preferred embodiments of the invention, it is to be understood that the invention is not limited to these precise forms of apparatus, and that changes may be made therein without departing from the scope of the invention.

What is claimed is:

1. A pressure bulkhead comprising:
a bulkhead wall having a radially inner disk of a first thickness and a radially outer compression ring of a second thickness defining a convex surface as a first side of the bulkhead wall, wherein the radially outer compression ring defines a periphery of the bulkhead wall, and the second thickness is greater than the first thickness;
wherein the second thickness of the outer compression ring is effective to provide a strength to oppose meridional and hoop stresses across the surface of the radially inner disk in response to a pressure differential across the bulkhead wall; and the radially inner disk being unitary with the outer compression ring and being made of the same material as the outer compression ring; and
an attachment ring having a concave surface oriented toward a non-pressurized area and attached to the first side and the periphery of the bulkhead wall.

2. The pressure bulkhead of claim 1, wherein the thickness of the radially inner disk tapers convergently from an outer periphery thereof adjacent the outer compression ring toward a center of the radially inner disk.

3. The pressure bulkhead of claim 1, wherein the radially inner disk and the outer compression ring are made of carbon fiber reinforced plastic.

4. The pressure bulkhead of claim 1, further comprising a plurality of stiffeners attached to the bulkhead wall, the plurality of stiffeners extending in one of a radial direction and a Cartesian configuration.

5. The pressure bulkhead of claim 1, further comprising an attachment mechanism selected from an attachment ring attached to the bulkhead wall and the outer compression ring, and one or more doubler rings attached to the bulkhead wall.

6. The pressure bulkhead of claim 5, further comprising plurality of clips configured to attach the attachment ring to a wall.

7. The pressure bulkhead of claim 6, wherein the wall is the skin of an aircraft.

8. The pressure bulkhead of claim 1, wherein the bulkhead wall is dome shaped.

9. A pressure bulkhead comprising:
a bulkhead wall having a radially inner disk of a first thickness made of an isotropic carbon fiber reinforced plastic laminate, and an outer compression ring of a second thickness made of an orthotropic carbon fiber reinforced plastic laminate attached to and extending about a periphery of the radially inner disk, and having a convex surface as a first side;
wherein the second thickness is greater than the first thickness, and the second thickness of the outer compression ring is of a thickness providing sufficient strength to balance meridional and hoop stresses sustained by the dome-shaped bulkhead wall in response to a pressure load applied to the bulkhead wall; and
an attachment ring having a concave surface oriented toward a non-pressurized area and attached to the first side of the bulkhead wall at the outer compression ring.

10. A vehicle comprising:
a fuselage having a skin; and
the pressure bulkhead according to claim 1 attached to the skin about a periphery of the compression ring.

11. The vehicle according to claim 10, wherein the pressure bulkhead further comprises an attachment ring having a radially inner band and a radially outer band, the attachment ring shaped to form a concave surface oriented toward a non-pressurized section of the vehicle fuselage; and wherein the radially outer band is attached to a skin of the vehicle fuselage and the radially inner band is attached to the compression ring.

12. A vehicle comprising:
a fuselage having a skin; and
the pressure bulkhead according to claim 9 attached to the skin about a periphery of the compression ring.

13. The vehicle of claim 10, wherein the vehicle is one of an aircraft, a spacecraft, a marine vessel, and a land vehicle.

14. The pressure bulkhead of claim 2, wherein the thickness of the radially inner disk tapers convergently on the major convex surface of the bulkhead wall.

15. The pressure bulkhead of claim 1, wherein the material is selected from the group consisting of a reinforced plastic, a metal, a poly-paraphenylene terephthalamide, and combinations thereof.

16. The pressure bulkhead of claim 1, further comprising a plurality of clips on the concave surface of the attachment ring configured to fix the attachment ring to a skin of a vehicle.

* * * * *